July 9, 1929.  E. C. MOGFORD  1,719,941
VEHICLE WHEEL BEARING
Filed Sept. 26, 1924
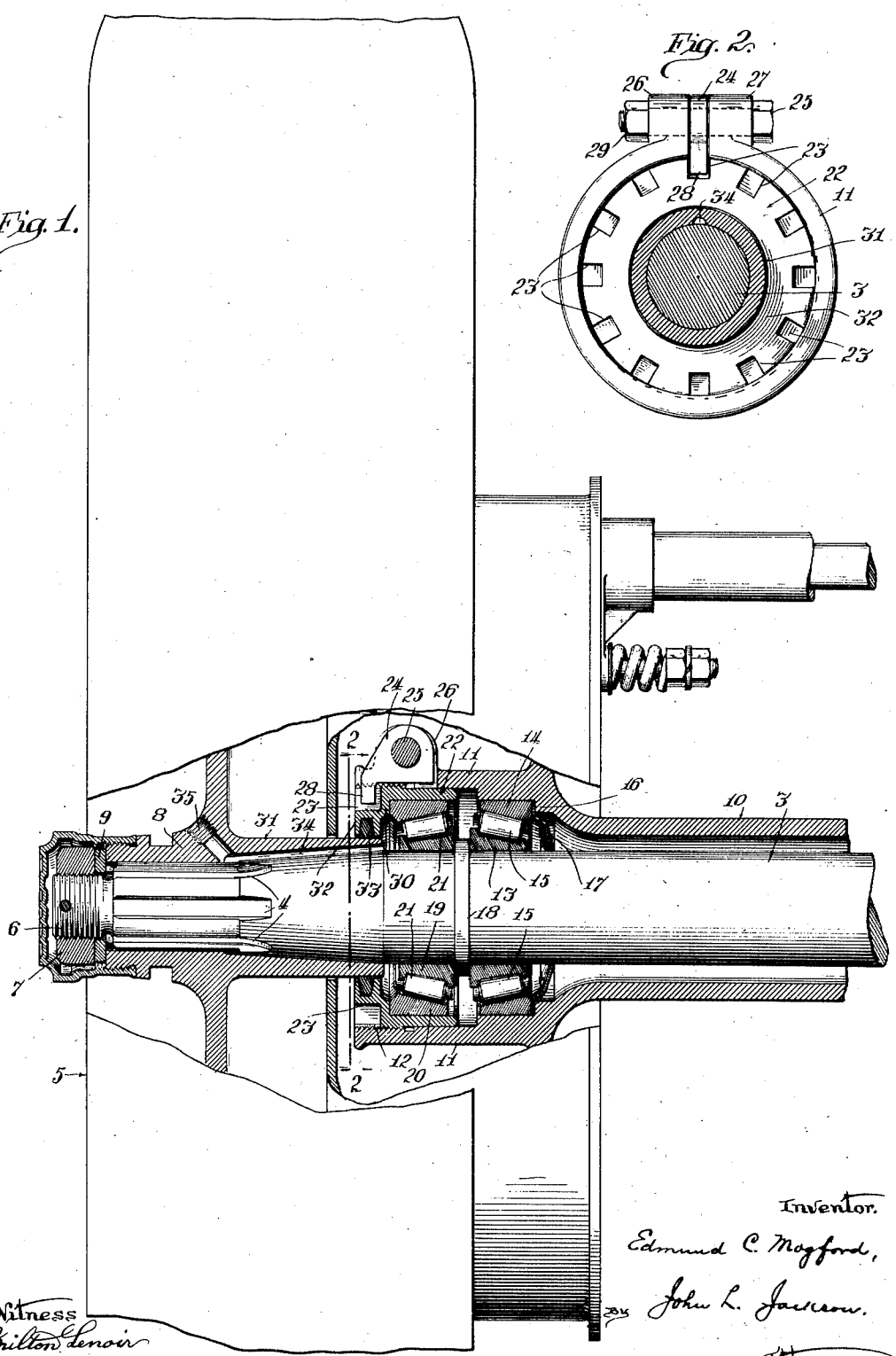

Patented July 9, 1929.

1,719,941

UNITED STATES PATENT OFFICE.

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN.

VEHICLE WHEEL BEARING.

Application filed September 26, 1924. Serial No. 740,028.

My invention relates to bearings for vehicle wheels, and has to do particularly with wheels mounted on the rear axle of a motor vehicle of the type in which the rear axle is mounted to rotate in sleeves projecting laterally from the usual differential housing to which they are fixedly secured. The object of my invention is to provide an improved bearing for use in such situations, which may be readily adjusted to take up wear, which will be effectively protected against dirt, and which may be conveniently lubricated. I accomplish this object as illustrated in the drawings and hereinafter described. What I regard as new is set forth in the claims.

In the accompanying drawings, in which I have illustrated only such parts as are necessary to a full understanding of my invention,—

Fig. 1 is a view, partly broken away and partly in longitudinal section, showing the outer end portion of one of the live members of the rear axle of a motor vehicle, with the outer end portion of the sleeve in which it is mounted, and a portion of one of the wheels of the vehicle; and Fig. 2 is a vertical cross-section on line 2—2 of Fig. 1.

Referring to the drawings,—3 indicates the live axle member, which is in the form of a shaft the inner end of which is connected with the usual differential mechanism, while at its outer end it is provided with longitudinal grooves or keyways 4 by means of which a wheel 5 is fitted upon the end of the axle may be non-rotatably secured thereto by means of a key in the usual way. The outer end portion of said axle member is also screw-threaded, as shown at 6, to receive a nut 7 by which the wheel may be removably secured on the axle. As shown in said figure, the wheel is provided with a hub 8 which fits closely upon the end portion of the axle member, and between the outer end portion of said hub and the nut 7 is interposed a washer 9, so that through said washer the nut 7 takes the outward end thrust of the wheel. The construction thus far described is old and well known.

The axle member 3 extends through a sleeve 10, the inner end portion of which is connected with the differential housing in the usual way, while its outer end portion is somewhat enlarged to form a drum 11 integral therewith, the outer portion of which is of greater diameter than the inner portion thereof and adjacent to its margin is internally screw-threaded as shown at 12. Mounted within the reduced inner portion of the drum 11 is an anti-friction bearing comprising an inner ring plate 13, an outer ring plate 14, and a plurality of rollers 15 interposed between said ring plates and held in position by them. The inner ring plate 13 fits closely upon the peripheral portion of the axle member 3, and the outer ring plate 14 fits closely in the bore at the inner end portion of the drum 11, and bears against an annular shoulder 16 formed in said drum, as shown in Fig. 1. Preferably, a shield 17, in the form of a thin metal plate having a central opening for the passage of the axle member 3, has its marginal portion interposed between the ring plate 14 and the shoulder 16 so that it is held in place by said ring plate. Said shield serves to prevent the escape of lubricant from the interior of the drum 11 into the sleeve 10 around the axle member 3. The inner bearing, comprising the ring plates 13, 14 and the anti-friction rollers or equivalent devices, is held seated by means of a collar 18 integral with the axle member 3, which bears against the outer end portion of the ring plate 13.

Mounted in the enlarged outer portion of the drum 11, at the opposite or outer side of the collar 18, is a second anti-friction bearing, similar to the other, and comprising an inner ring plate 19, an outer ring plate 20, and a series of intermediate rollers or other anti-friction devices 21 interposed between said ring plates. It will be noted, however, that the axes of the rollers 16 and 21 are oppositely inclined, the pair of ring plates between which the rollers 21 are mounted accordingly being reversely arranged with reference to those between which the rollers 16 are mounted. The ring plate 20 is not mounted directly in the drum 11, as is the case with the ring plate 14, but is mounted in a cage or adjustable sleeve 22 which is adapted to fit closely in the bore of the enlarged outer portion of the drum 11, but may rotate to provide for its adjustment longitudinally thereof. The outer end portion of the cage 22 is screw-threaded, as shown in Fig. 1 to fit the screw-threaded portion 12 of said drum. Obviously, therefore, by rotating said cage it may be adjusted in said drum longitudinally of the axle member 3. It will be noted that the inner portion of the cage 22 bears in the enlarged outer portion of the drum, and that the internal diameter of the enlarged portion of the drum and the thickness of the cage 22 are such that the outer ring plates 14 and 20 of the two sets of anti-friction bearings are of the same diameter. In other words, the sets of anti-friction bearings are alike, but are oppositely disposed upon the axle. For locking the cage 22 in its different positions of adjustment it is provided on its periphery with a series of notches 23, as shown in Fig. 2, which are adapted to be engaged by a key 24 shown in Figs. 1 and 2. This key is in the form of a metal plate which is mounted on a bolt 25 fitted between a pair of lugs 26, 27 placed conveniently on the outer portion of the drum 11 and spaced apart a sufficiently distance to receive the key 24 between them. Said key is provided with a depending dog 28 which is adapted to enter whichever one of the notches 23 happens to be in position to receive it, thereby preventing rotation of the cage 22. When it is desired to adjust the cage, the key 24 may be removed by unscrewing the nut 29 on one end of the bolt 25 and withdrawing said bolt.

The outer ring plate 20 fits closely in the cage 22 and bears against a shoulder 30 at the inner end portion thereof, so that, as will be apparent, by adjusting the cage 22 inwardly along the axle member 3 the outer anti-friction bearing will be moved in the same direction, i. e., toward the inner anti-friction bearing, which is held in fixed position by its engagement with the shoulder 16. The collar 18 on the axle member 3 will, therefore, be held in proper relation to both bearings.

As shown in Fig. 1, the hub 8 of the wheel 4 is provided with an inwardly-extending sleeve 31, the inner end portion of which extends into the outer end portion of the cage 22, at which point said cage is provided with an inwardly-extending annular flange 32 having a groove in which is placed a washer 33. Said washer bears upon the outer surface of the wheel sleeve 31 and prevents the escape of lubricant at that side of the bearing. It also prevents the admission of dirt to the bearings. Lubricant is admitted to the bearings through a duct 34 extending longitudinally of the inner face of the sleeve 31 and connecting with a duct 35 in the hub 8, through which lubricant may be introduced. The outer end of the duct 35 is screw-threaded to receive a suitable cap or other device for closing it.

The wheel 5 in the form illustrated is provided with a brake drum 36, but as the braking devices are not included in my present invention they are not illustrated in detail and need not be described.

I am aware of the fact that it is not new broadly to mount a wheel on an axle member supported by a plurality of juxtaposed anti-friction bearings, but so far as I am aware it is new to mount such bearings in the manner described so that the outer bearing may be readily adjusted, and to provide the other specific features of improvement pointed out in the claims.

What I claim as my invention and desire to secure by Letters Patent, is—

1. The combination of an axle member having a fixed collar, a sleeve surrounding said axle member, the outer end portion of said sleeve being enlarged to form a drum, inner and outer anti-friction bearings in said drum at opposite sides of said collar and adapted to bear thereagainst, means for adjusting the outer anti-friction bearing toward and from said inner anti-friction bearing comprising a cage in which said outer bearing is fitted, said cage being adjustably mounted in said drum to move longitudinally thereof, and having an inwardly projecting annular flange adjacent to its outer end provided with a groove at its inner margin, a wheel mounted on said axle member and having a sleeve projecting through said annular flange, a washer fitted in the groove of said flange and bearing on the outer surface of the latter sleeve, and an oil duct extending through the latter sleeve into the interior of the drum.

2. The combination of an axle member having a fixed collar, a sleeve surrounding said axle member and having a drum at its outer end, the inner portion of said drum being of reduced diameter with respect to the outer portion thereof, an inner anti-friction bearing fitted in the reduced portion of said drum and bearing against the inner face of said collar, a cage fitted in the enlarged outer portion of said drum and having screw-threaded engagement therewith, an anti-friction bearing fitted in said cage and adapted to bear against the outer face of said collar, an inwardly projecting annular flange adjacent to the outer end of said cage and provided with a groove at its inner margin, a wheel mounted on said axle member and having a sleeve projecting through said annular flange, a washer fitted in the groove of said flange and bearing on the outer surface of the latter sleeve, and an oil duct extending through the latter sleeve into the interior of the drum.

3. The combination of an axle member having a fixed collar, a sleeve surrounding said axle member and having a drum at its outer end, the inner portion of said drum being of reduced internal diameter with respect to the outer portion thereof, the outer portion of said drum being internally screw-threaded adjacent to its margin, an anti-friction bearing fitted in the reduced inner portion of said drum and bearing against the inner face of said collar, a cage fitted in the enlarged outer portion of said drum, said cage being screw-threaded to engage the threads on the drum, an anti-friction bearing fitted in said cage and bearing against the outer face of said collar, an inwardly projecting annular flange adjacent to the outer end of said cage and provided with a groove at its inner margin, a wheel mounted on said axle member and having a sleeve projecting through said annular flange, a washer fitted in the groove of said flange and bearing on the outer surface of the latter sleeve, and an oil duct extending through the latter sleeve into the interior of the duct.

4. The combination of an axle member having a fixed collar, a sleeve surrounding said axle member and having its outer end portion enlarged to form an integral drum, the inner end portion of said drum being of reduced internal diameter and having an integral shoulder at its inner end, an anti-friction bearing mounted in said reduced inner portion of the drum and bearing against said shoulder and against the inner face of said collar, a cage mounted in the outer portion of said drum to move longitudinally thereof, an anti-friction bearing mounted in said cage and bearing against the outer face of said collar, means for securing said cage in fixed relation to the drum, an inwardly projecting annular flange carried by said cage and provided with a groove at its inner margin, a wheel mounted on said axle member and having a sleeve projecting through said annular flange, a washer fitted in the groove of said flange and bearing on the outer surface of the latter sleeve, and an oil duct extending through the latter sleeve into the interior of the drum.

5. The combination of an axle member having a fixed collar, a sleeve surrounding said axle member, the outer portion of said sleeve being enlarged to form an integral drum, an anti-friction bearing mounted in the inner portion of said drum and bearing against the outer face of said collar, a shield between the inner end of said anti-friction bearing and the inner end portion of the drum, an anti-friction bearing mounted in the outer portion of said drum and bearing against the outer face of said collar, a wheel mounted on said axle member and having a sleeve projecting into said drum, an oil duct extending through the latter sleeve into the interior of the drum, and means mounted in the drum and adjustable longitudinally thereof to adjust the outer anti-friction bearing and cooperating with the latter sleeve to retain lubricant in the drum.

6. The combination of an axle member having a fixed collar, a sleeve surrounding said axle member, the outer portion of said sleeve being enlarged to form an integral drum, an anti-friction bearing mounted in the inner portion of said drum and bearing against the outer face of said collar, a shield between the inner end of said anti-friction bearing and the inner end portion of the drum, an anti-friction bearing mounted in the outer portion of said drum and bearing against the outer face of said collar, a wheel mounted on said axle member and having a sleeve projecting into said drum, an oil duct extending through the latter sleeve into the interior of the drum, and a cage fitted in the outer portion of the drum around the outer anti-friction bearing, said cage being adjustable to adjust the latter bearing, and having means cooperating with the latter sleeve to prevent the escape of lubricant from the drum.

EDMUND C. MOGFORD.